United States Patent
Yamazaki et al.

(10) Patent No.: US 11,455,533 B2
(45) Date of Patent: Sep. 27, 2022

(54) INFORMATION PROCESSING APPARATUS, CONTROL METHOD, AND NON-TRANSITORY COMPUTER-READABLE STORAGE MEDIUM FOR STORING INFORMATION PROCESSING PROGRAM

(71) Applicant: FUJITSU LIMITED, Kawasaki (JP)

(72) Inventors: Masafumi Yamazaki, Tachikawa (JP); Akihiko Kasagi, Kawasaki (JP); Akihiro Tabuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 358 days.

(21) Appl. No.: 16/852,611

(22) Filed: Apr. 20, 2020

(65) Prior Publication Data
US 2020/0372347 A1 Nov. 26, 2020

(30) Foreign Application Priority Data
May 21, 2019 (JP) .............................. JP2019-095469

(51) Int. Cl.
*G06N 3/08* (2006.01)
*G06N 3/04* (2006.01)
(52) U.S. Cl.
CPC ................ *G06N 3/08* (2013.01); *G06N 3/04* (2013.01)
(58) Field of Classification Search
USPC ........................................................ 706/25
See application file for complete search history.

(56) References Cited

U.S. PATENT DOCUMENTS

| 11,256,698 | B2* | 2/2022 | Idicula | G06N 3/0454 |
| 2017/0004399 | A1 | 1/2017 | Kasahara | |
| 2020/0042362 | A1* | 2/2020 | Cui | G06K 9/6274 |
| 2020/0342297 | A1* | 10/2020 | Dai | G06K 9/6282 |
| 2021/0004688 | A1* | 1/2021 | Baker | G06N 3/084 |
| 2022/0058467 | A1* | 2/2022 | Baker | G06N 3/0481 |

FOREIGN PATENT DOCUMENTS

| JP | 2017-16414 A | 1/2017 |
| JP | 2017-126260 A | 7/2017 |

OTHER PUBLICATIONS

Extended European Search dated Oct. 1, 2020 for corresponding European Patent Application No. 20169584.8, 9 pages.

(Continued)

*Primary Examiner* — Pierre E Elisca
(74) *Attorney, Agent, or Firm* — Fujitsu Patent Center

(57) ABSTRACT

A method of controlling an information processing apparatus, the information processing apparatus being configured to perform learning processing by using a neural network, the method includes: executing a calculation processing that includes calculating a learning rate, the learning rate being configured to change in the form of a continuous curve such that the time from when the learning rate is at an intermediate value of a maximum value to when the learning rate reaches a minimum value is shorter than the time from when the learning processing starts to when the learning rate reaches the intermediate value of the maximum value; and executing a control processing that includes controlling, based on the calculated learning rate, an amount of update at the time when a weight parameter is updated in an update processing.

6 Claims, 8 Drawing Sheets

(56) References Cited

OTHER PUBLICATIONS

Sayadi, Karim et al., "Character-Level Dialect Identification in Arabic Using Long Short-Term Memory", Oct. 10, 2018, Annual International Conference on the Theory and Applications of Cryptographic Techniques, Eurocrypt 2018; [Lecture Notes in Computer Science; Lect.Notes Computer], Springer, Berlin, Heidelberg, pp. 324-337, XP047489463, [retrieved on Oct. 10, 2018].
Hsueh,Bo-Yang et al., "Stochastic Gradient Descent with Hyperbolic-Tangent Decay on Classification", 2019 IEEE Winter Conference on Applications of Computer Vision (WACV), IEEE, Jan. 7, 2019, pp. 435-142, XP033525698.
EPOA—European Office Action of European Patent Application No. 20169584.8 dated Dec. 21, 2021.
European Office Action dated Apr. 26, 2021 for corresponding European Patent Application No. 20169584.8, 5 pages.

* cited by examiner

INFORMATION PROCESSING APPARATUS, CONTROL METHOD, AND NON-TRANSITORY COMPUTER-READABLE STORAGE MEDIUM FOR STORING INFORMATION PROCESSING PROGRAM

CROSS-REFERENCE TO RELATED APPLICATION

This application is based upon and claims the benefit of priority of the prior Japanese Patent Application No. 2019-95469, filed on May 21, 2019, the entire contents of which are incorporated herein by reference.

FIELD

The embodiments discussed herein are related to an information processing apparatus, a control method, and a non-transitory computer-readable storage medium for storing an information processing program.

BACKGROUND

Learning processing using deep neural networks (DNNs) in many cases includes forward propagation processing for recognizing input data, backward propagation processing in which gradient information is calculated while the difference values between recognition result and correct data are being propagated backward, and update processing for updating weight parameters based on the gradient information.

In the update processing of these processes for updating weight parameters, the update amount is controlled based on the learning rate (LR). The learning rate used in this process is normally set to a large value at the start of the learning processing and changed to a smaller value as the learning processing advances.

Examples of the related art include Japanese Laid-open Patent Publication Nos. 2017-126260 and 2017-16414.

SUMMARY

According to an aspect of the embodiments, a method of controlling an information processing apparatus, the information processing apparatus being configured to perform learning processing by using a neural network, the method includes: executing a calculation processing that includes calculating a learning rate, the learning rate being configured to change in the form of a continuous curve such that the time from when the learning rate is at an intermediate value of a maximum value to when the learning rate reaches a minimum value is shorter than the time from when the learning processing starts to when the learning rate reaches the intermediate value of the maximum value; and executing a control processing that includes controlling, based on the calculated learning rate, an amount of update at the time when a weight parameter is updated in an update processing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

However, in the case of learning processing using DNNs, how the learning rate used in the update processing is changed affects the performance of the learning result (the trained model) obtained within a finite time.

In one aspect, an object is to improve the performance of learning result.

The disclosure improves the performance of learning result.

Hereinafter, embodiments are described with reference to the accompanying drawings. In the present specification and the drawings, components having substantially the same functional configurations are assigned with the same reference signs, and duplicated description is omitted.

First Embodiment

<Functional Configuration of Information Processing Apparatus>

Figure 1:
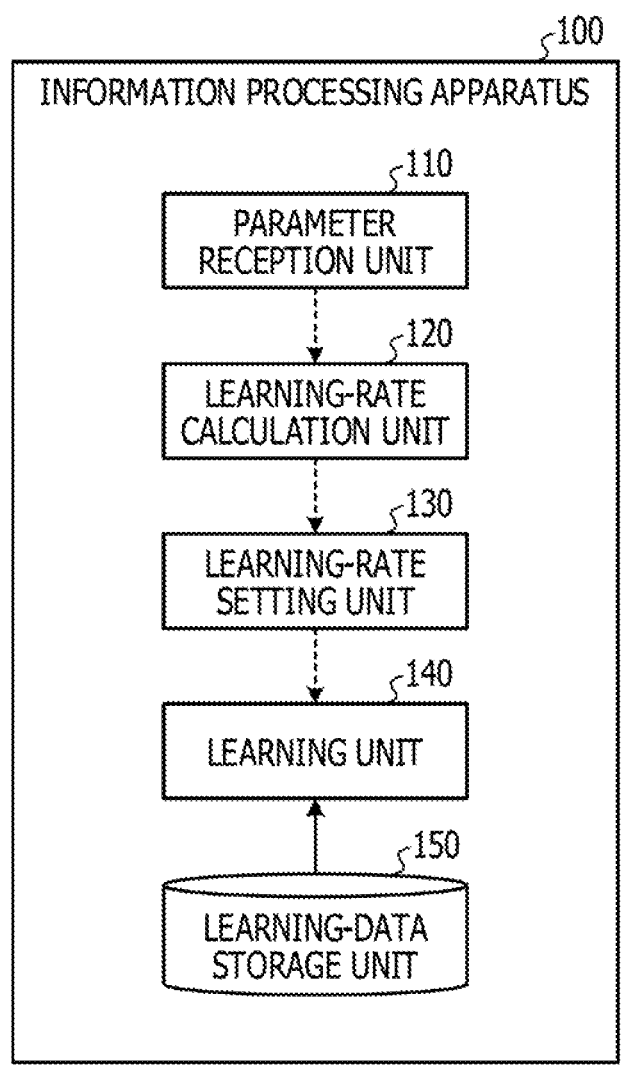
FIG. 1 illustrates an example of the functional configuration of an information processing apparatus.

First, description is made of the functional configuration of an information processing apparatus that performs learning processing using deep neural networks (DNNs). FIG. 1 illustrates an example of the functional configuration of an information processing apparatus. The information processing apparatus 100 has an information processing program installed, and when the program is executed, the information processing apparatus 100 functions as a parameter reception unit 110, a learning-rate calculation unit 120, a learning-rate setting unit 130, and a learning unit 140.

The parameter reception unit 110, which is an example of a reception unit, receives parameters used for calculating a continuous curve indicating change in the learning rate during learning processing. The parameters received by the parameter reception unit 110 are communicated to the learning-rate calculation unit 120.

The learning-rate calculation unit 120, which is an example of a calculation unit, calculates a continuous curve indicating change in the learning rate during learning processing based on the parameters communicated from the parameter reception unit 110, and communicates the continuous curve to the learning-rate setting unit 130.

The learning-rate setting unit 130 sets the continuous curve indicating change in the learning rate, communicated from the learning-rate calculation unit 120 into the learning unit 140.

The learning unit 140 performs learning processing using DNNs. For example, the learning unit 140 reads input data from a learning-data storage unit 150 and recognizes the read input data, which processing is called forward propagation processing.

The learning unit 140 reads correct data from the learning-data storage unit 150 and calculates the difference values between the recognition result obtained from the forward propagation processing and the read correct data. The learning unit 140 also calculates gradient information while propagating the calculated difference values backward, which processing is called backward propagation processing.

Further, the learning unit 140 updates weight parameters based on the gradient information, which processing is called update processing. When the learning unit 140 updates the weight parameters, the learning unit 140 obtains the learning rate by referring to the continuous curve indicating change in the learning rate, set by the learning-rate setting unit 130, and then the learning unit 140 controls the amount of update based on the obtained learning rate.

<Hardware Configuration of Information Processing Apparatus>

Figure 2:
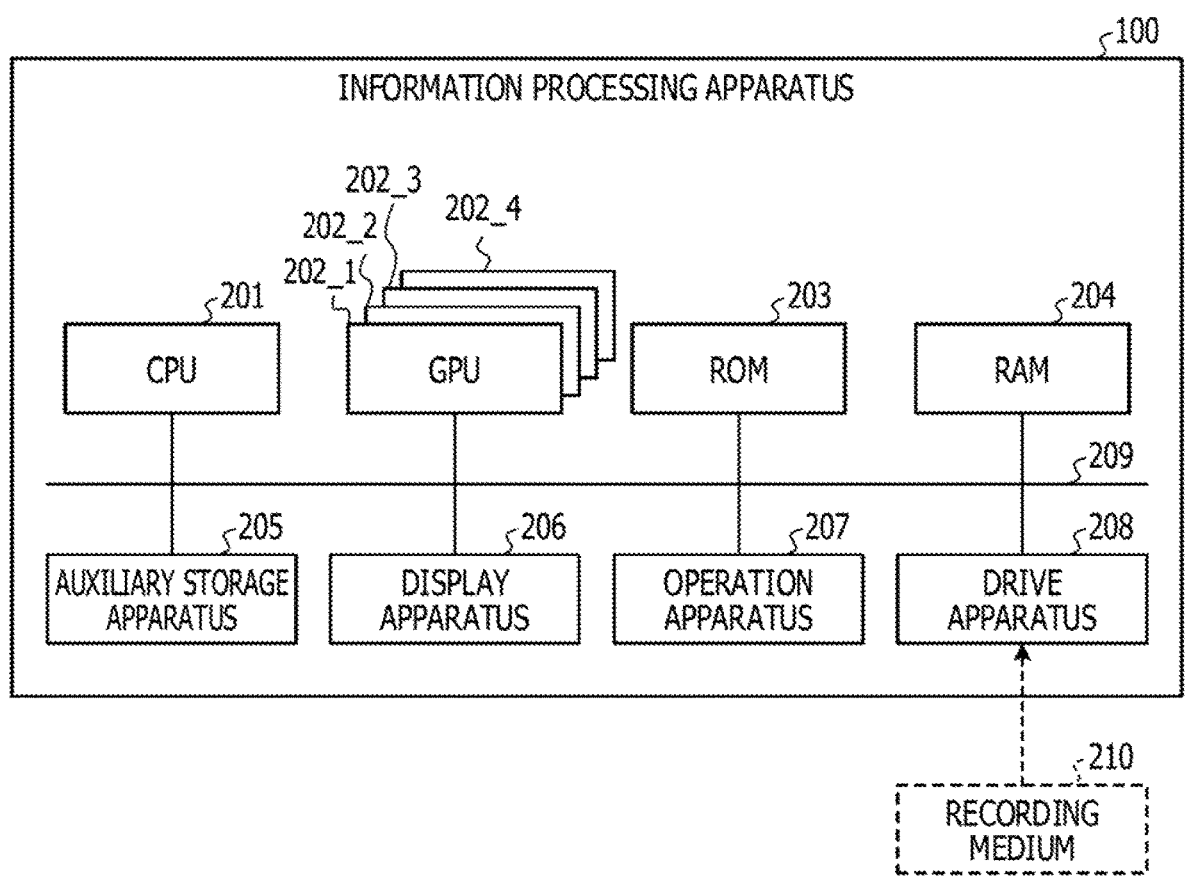
FIG. 2 illustrates an example of the hardware configuration of the information processing apparatus.

Next, the hardware configuration of the information processing apparatus 100 is described, FIG. 2 illustrates an example of the hardware configuration of the information processing apparatus. As illustrated in FIG. 2, the information processing apparatus 100 includes a central processing unit (CPU) 201 and graphics processing units (GPUs) 202_1 to 202_4. The information processing apparatus 100 also includes read-only memory (ROM) 203 and random-access memory (RAM) 204. The CPU 201, GPUs 202_1 to 202_4, ROM 203, and RAM 204 form a so-called computer.

The information processing apparatus 100 also includes an auxiliary storage apparatus 205, display apparatus 206, operation apparatus 207, and drive apparatus 208. The hardware components in the information processing apparatus 100 is coupled to each other via a bus 209.

The CPU 201 is a computing device for executing various programs (for example, information processing programs and others) installed in the auxiliary storage apparatus 205.

The GPUs 202_1 to 202_4 are computing devices for image processing, and when the CPU 201 executes various programs, the GPUs 202_1 to 202_4 execute high-speed computation by parallel processing on input data that is image data. Although the example of FIG. 2 illustrates a case where the information processing apparatus 100 has four GPUs, the number of GPUs included in the information processing apparatus 100 is not limited to four.

The ROM 203 is nonvolatile memory. The ROM 203 functions as a main storage device that stores various programs, data, and the like to be used for the CPU 201 executing various programs installed in the auxiliary storage apparatus 205. For example, the ROM 203 functions as a main storage device that stores boot programs such as a Basic Input/Output System (BIOS) and an Extensible Firmware Interface (EFI).

The RAM 204 is volatile memory such as dynamic random-access memory (DRAM) or static random-access memory (SRAM). The RAM 204 functions as a main storage device that provides a work area into which various programs installed in the auxiliary storage apparatus 205 are loaded when the various programs are executed by the CPU 201.

The auxiliary storage apparatus 205 is an auxiliary storage device that stores various programs and data to be used when the various programs are executed. For example, the learning-data storage unit 150 is implemented in the auxiliary storage apparatus 205.

The display apparatus 206 is a display device that displays the internal state or the like of the information processing apparatus 100. The operation apparatus 207 is an input device used when a user of the information processing apparatus 100 inputs various instructions to the information processing apparatus 100.

The drive apparatus 208 is a device in which a recording medium 210 is set. Examples of the recording medium 210 discussed herein include media that record information optically, electrically, or magnetically such as a CD-ROM, a flexible disk, and a magnetooptical disk. Examples of the recording medium 210 may also include semiconductor memory that records information electrically, such as ROM and flash memory.

Various programs installed in the auxiliary storage apparatus 205 are installed, for example, by setting a distributed recording medium 210 into the drive apparatus 208 and the drive apparatus 208 reading the various programs recorded in the recording medium 210. Alternatively, the various programs installed in the auxiliary storage apparatus 205 may be installed by being downloaded from a not-illustrated network.

<Description of Learning Data>

Figure 3:
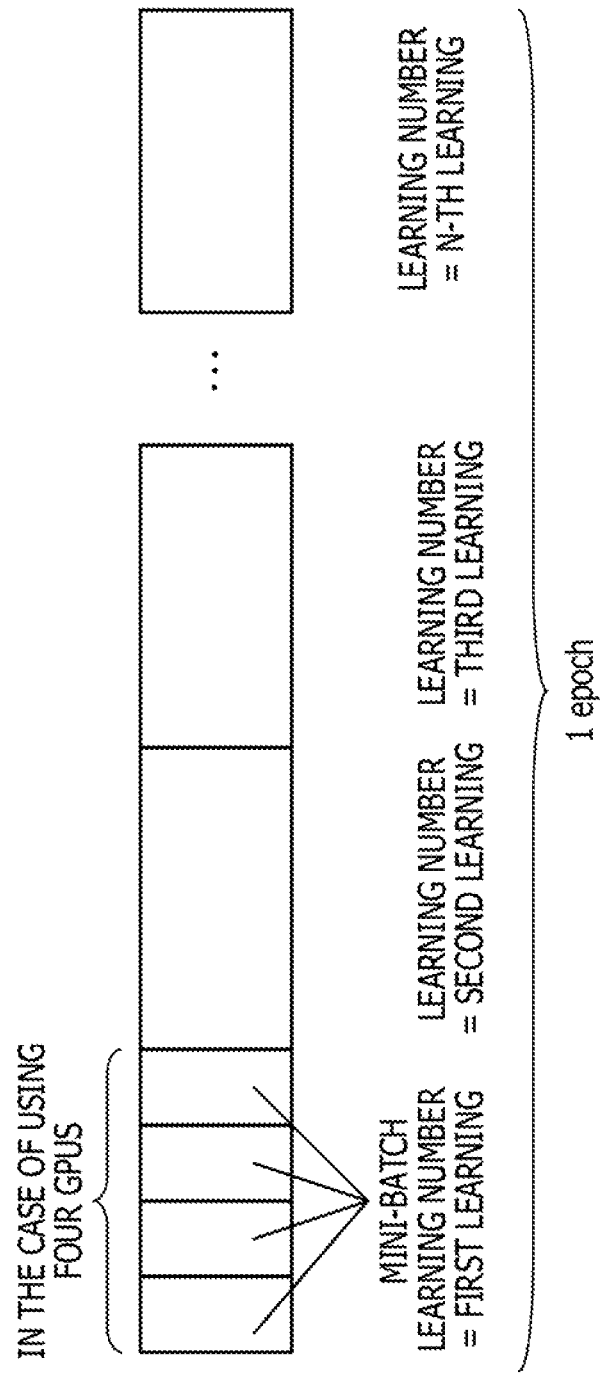
FIG. 3 illustrates a configuration example of learning data in learning processing.

Next, learning data stored in the learning-data storage unit 150 is described. FIG. 3 illustrates a configuration example of learning data in learning processing. As described above, since the information processing apparatus 100 has the four GPUs (GPUs 202_1 to 202_4), the information processing apparatus 100 receives input of four mini-batches for one step of learning. Here, assume that each mini-batch includes, for example, several hundreds of data sets (sets of input data and correct data).

The example in FIG. 3 indicates that N steps of learning are performed in one epoch. Specifically, the learning-data storage unit 150 stores a group of data of (several hundreds of data sets)×4×N, and the learning unit 140 in learning processing repeats learning for one epoch illustrated in FIG. 3 multiple times (for example, 90 times).

<Functional Configuration of Learning Unit>

Figure 4:
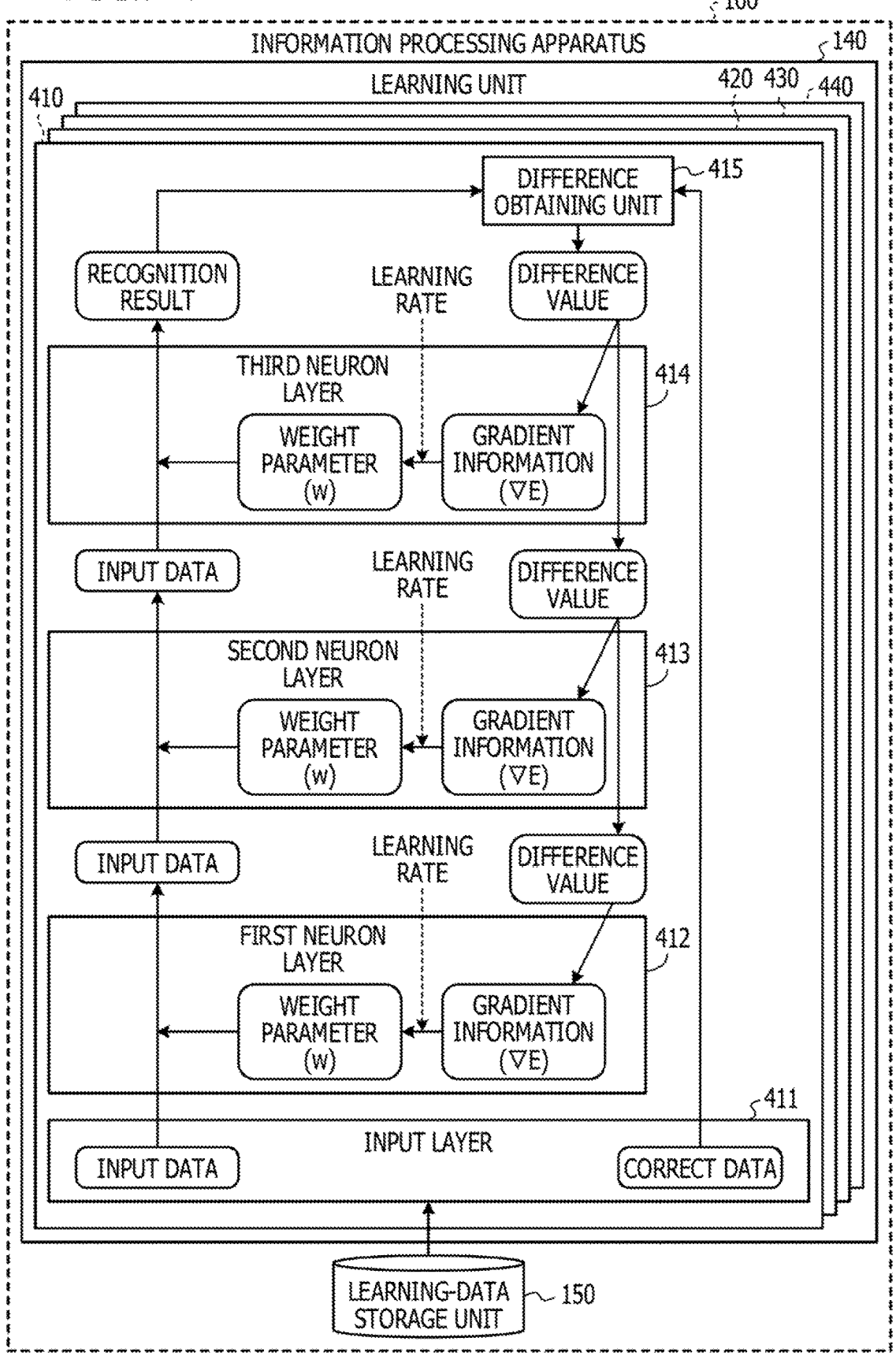
FIG. 4 illustrates an example of the functional configuration of a learning unit of the information processing apparatus.

Next, the functional configuration of the learning unit 140 is described. FIG. 4 illustrates an example of the functional configuration of the learning unit of the information processing apparatus. Since the information processing apparatus 100 has the four GPUs (GPUs 202_1 to 202_4) as described above, the learning unit 140 has four separate functional blocks (functional blocks 410 to 440), each of which performs learning processing in parallel. Each functional block 410 to 410 has the same or a similar function, and hence, here the function of the functional block 410 is described.

The functional block 410 is implemented by means of the GPU 202_1, and includes, as illustrated in FIG. 4, an input layer 411; a first neuron layer 412, a second neuron layer 413, and a third neuron layer 414, which are an examples of a control unit; and a difference obtaining unit 415. The number of neuron layers included in the functional block 410 is not limited to three.

The input layer 411 reads sets of input data and correct data in units of mini-batches from the learning-data storage unit 150 and inputs the input data into the first neuron layer 412. The input layer 411 also inputs the correct data into the difference obtaining unit 415.

The first neuron layer 412 calculates gradient information from difference values calculated in the previous learning and performs computation on the input data using weight parameters updated based on the calculated gradient information. The first neuron layer 412 inputs the input data subjected to the computation into the second neuron layer 413. The first neuron layer 412 updates the weight parameters in an update amount according to the learning rate set by the learning-rate setting unit 130.

Similarly, the second neuron layer 413 calculates gradient information from difference values calculated in the previous learning and performs computation on the input data using weight parameters updated based on the calculated gradient information. The second neuron layer 413 inputs the input data subjected to the computation into the third neuron layer 414. The second neuron layer 413 updates the weight parameters in an update amount according to the learning rate set by the learning-rate setting unit 130.

Similarly, the third neuron layer 414 calculates gradient information from difference values calculated in the previous learning and performs computation on the input data using weight parameters updated based on the calculated gradient information. The third neuron layer 414 inputs recognition result obtained by performing computation on the input data into the difference obtaining unit 415. The third neuron layer 414 updates the weight parameters in an update amount according to the learning rate set by the learning-rate setting unit 130.

The difference obtaining unit 415 calculates the difference values between the correct data inputted from the input layer 411 and the recognition result inputted from the third neuron layer 414 and propagates the calculated difference values backward. With this process, the first neuron layer 412 to the third neuron layer 414 calculate the gradient information to be used for the next learning.

<Parameter Reception Unit and Learning-Rate Calculation Unit>

Next, the following describes the functional configurations of a parameter reception unit and a learning-rate calculation unit that calculate the learning rate used for updating the weight parameters based on the gradient information in each of the first to third neuron layers 412 to 414 of the learning unit 140.

Figure 5:
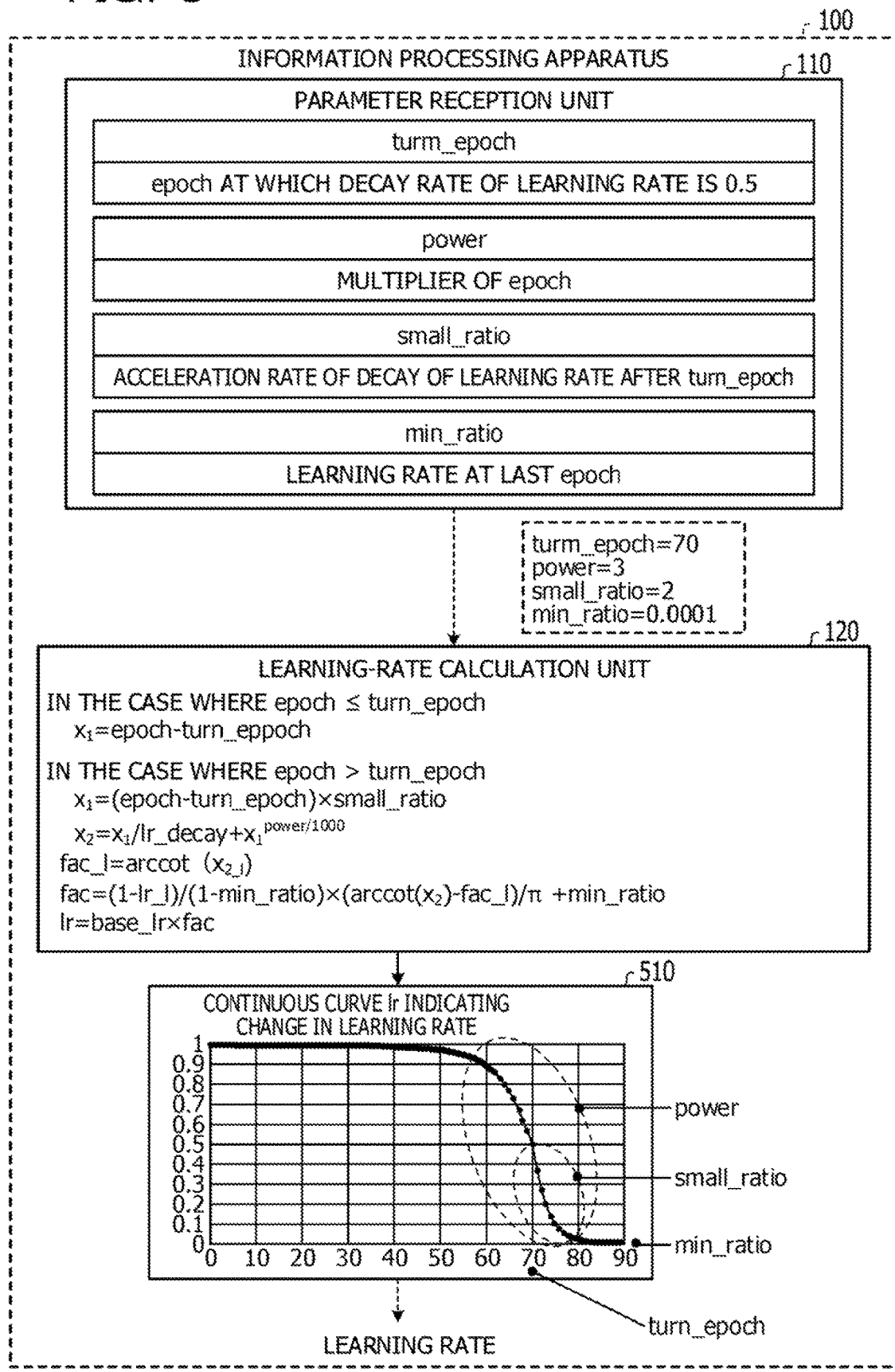
FIG. 5 is a first diagram illustrating examples of the functional configurations of a parameter reception unit and a learning-rate calculation unit of the information processing apparatus and a continuous curve indicating change in the learning rate.

FIG. 5 is a first diagram illustrating examples of the functional configurations of the parameter reception unit and the learning-rate calculation unit of the information processing apparatus and a continuous curve indicating change in the learning rate.

As illustrated in FIG. 5, the parameter reception unit 110 receives input of turn_epoch: the epoch at which the decay rate of the learning rate is 0.5 (the intermediate value of the maximum learning rate), power: the multiplier of the epoch, small_ratio: the acceleration rate of the decay of the learning rate after the turn_epoch (after the learning rate reaches the intermediate value of the maximum value until the learning rate reaches the minimum value), and min_ratio: the learning rate at the last epoch (the minimum value of the learning rate). The example of FIG. 5 indicates that turn_epoch=70, power=3, small_ratio=2, and min_ratio=0.0001 are inputted.

Using the parameters that the parameter reception unit 110 has received as input, the learning-rate calculation unit 120 calculates a continuous curve lr that indicates change in the learning rate during the learning processing based on the following equations.

in the case where epoch≤turn_epoch $$x_1 = epoch - turn\_epoch$$

in the case where epoch>turn_epoch $$x_1 = (epoch - turn\_epoch) \times small\_ratio$$

$$x_2 = x_1/lr\_decay + x_1^{power}/1000$$

$$fac\_l = arccot(x_{2\_l})$$

$$fac = (1 - lr\_l)/(1 - min\_ratio) \times (arccot(x_2) - fac\_l)/n + min\_ratio$$

$$lr = base\_lr \times fac$$

In the above equation, lr_decay represents the decay of the learning rate, $x_{2\_l}$ represents $x_2$ at the last epoch, lr_l represents lr at the last epoch, and base_lr represents a reference learning rate.

Graph 510 in FIG. 5 indicates an example of a continuous curve lr indicating change in the learning rate during learning processing, calculated by the learning-rate calculation unit 120. As illustrated in FIG. 5, the input of turn_epoch specifies the time at which the learning rate starts decaying. The input of power specifies the overall steepness of the learning-rate decay. The input of small_ratio specifies the steepness of the learning-rate decays after turn_epoch. Further, the input of min_ratio specifies the end of the learning processing.

In terms of calculating the continuous curve lr indicating change in the learning rate during learning processing, the applicants of the present application have found that "learning result with higher performance is achieved by making longer the state where the learning rate is high". For the parameter reception unit 110 and the learning-rate calculation unit 120, the user is allowed to specify the time at which the learning rate starts decaying (turn_epoch), the overall steepness of the learning-rate decay (power), and the steepness of the learning-rate decay after turn_epoch (small_ratio) so that a continuous curve reflective of this finding is calculated.

This configuration enables the parameter reception unit 110 and the learning-rate calculation unit 120 to calculate a continuous curve lr such that the time from when the learning rate is at the intermediate value of the maximum value to when the learning rate reaches the minimum value is shorter than the time from when the learning processing starts to when the learning rate reaches the intermediate value of the maximum value (for example, such that the period of the state where the learning rate is high is long).

<Procedure of Setting Processing and Learning Processing>

Figure 6A:
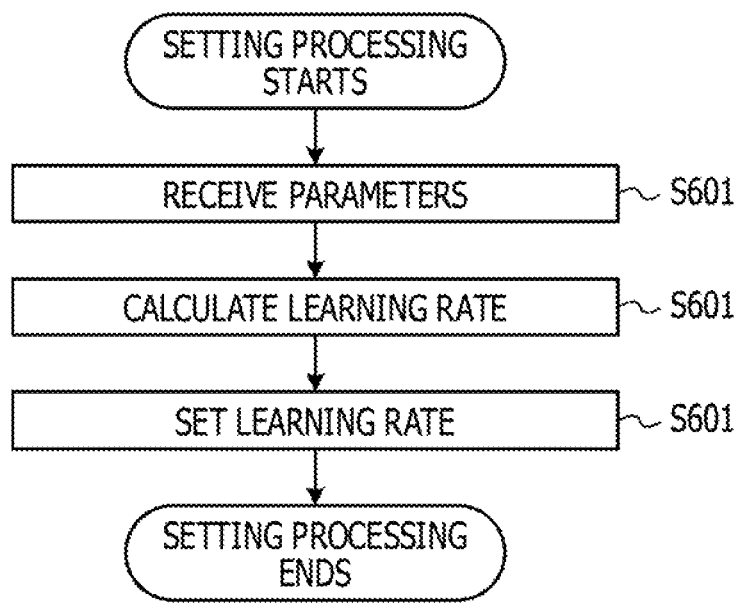
FIGS. 6A and B illustrate flowcharts regarding the procedures of setting processing and learning processing performed by the information processing apparatus.
Figure 6B:
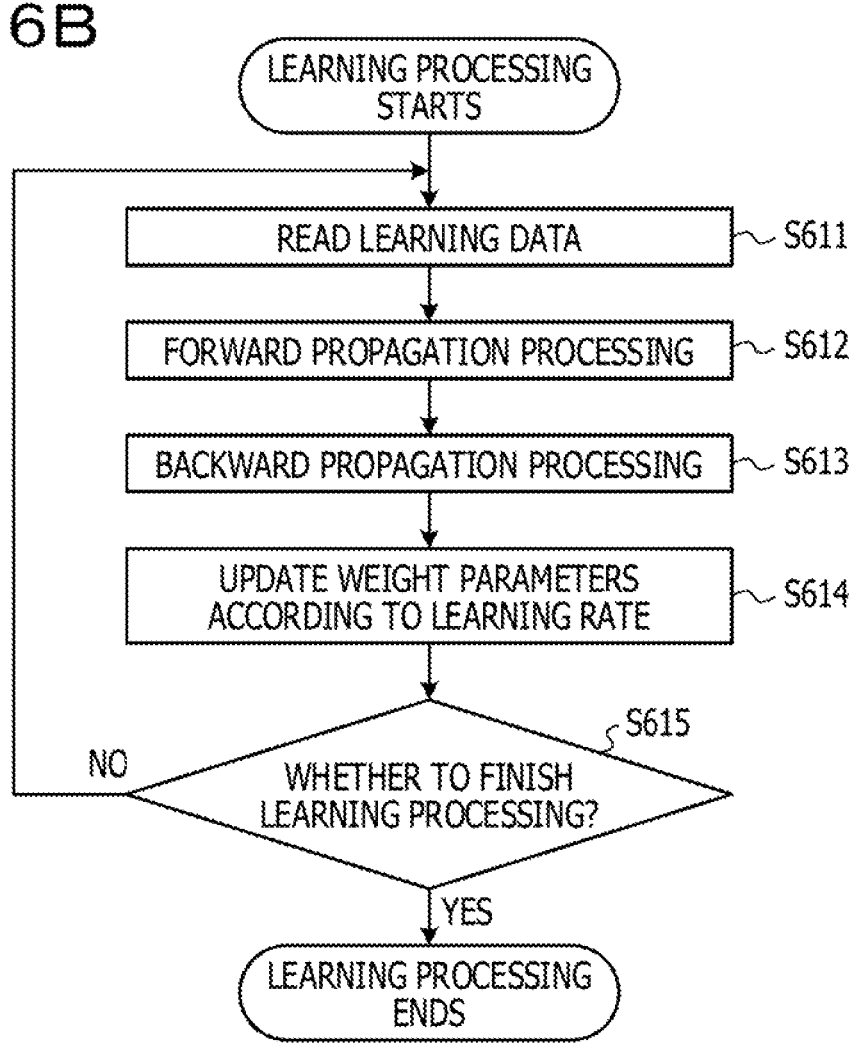

Next, the procedures of setting processing and learning processing performed by the information processing apparatus 100 is described. FIG. 6 (i.e., FIGS. 6A and 6B) is flowchart illustrating the procedures of setting processing and learning processing performed by the information processing apparatus.

Of these flowcharts, FIG. 6A is a flowchart illustrating the procedure of setting processing performed by the information processing apparatus 100. As illustrated in FIG. 6A, at step S601, the parameter reception unit 110 receives parameters used for calculating the continuous curve indicating change in the learning rate during learning processing.

At step S602, the learning-rate calculation unit 120 calculates a continuous curve indicating change in the learning rate during learning processing using the parameters received by the parameter reception unit 110.

At step S603, the learning-rate setting unit 130 sets the continuous curve indicating change in the learning rate during learning processing into the learning unit 140.

FIG. 6B is a flowchart illustrating the procedure of the learning processing performed by the information processing apparatus 100. As illustrated in FIG. 6B, at step S611, the learning unit 140 reads learning data in units of mini-batches from the learning-data storage unit 150.

At step S612, the learning unit 140 performs forward propagation processing on the input data included in the learning data read in units of mini-batches.

At step S613, the learning unit 140 calculates the difference values between the correct data included in the learning data read in units of mini-batches and the recognition result obtained by the forward propagation processing, and the learning unit 140 performs backward propagation processing in which the calculated difference values are propagated backward and the gradient information is calculated.

At step S614, the learning unit 140 performs update processing to update the weight parameters based on the gradient information. At this time, the learning unit 140 obtains a learning rate by referring to the continuous curve set by the learning-rate setting unit 130, and then the learning unit 140 controls the amount of update based on the obtained learning rate.

At step S615, the learning unit 140 determines whether to finish the learning processing. In the case where the learning unit 140 determines at step S615 to continue the learning processing (in the case of No at step S615), the process returns to step S611. In the case where the learning unit 140 determines at step S615 to stop the learning processing (in the case of Yes at step S615), the learning unit 140 ends the learning processing.

<Performance Comparison of Learning Result>

Figure 7:
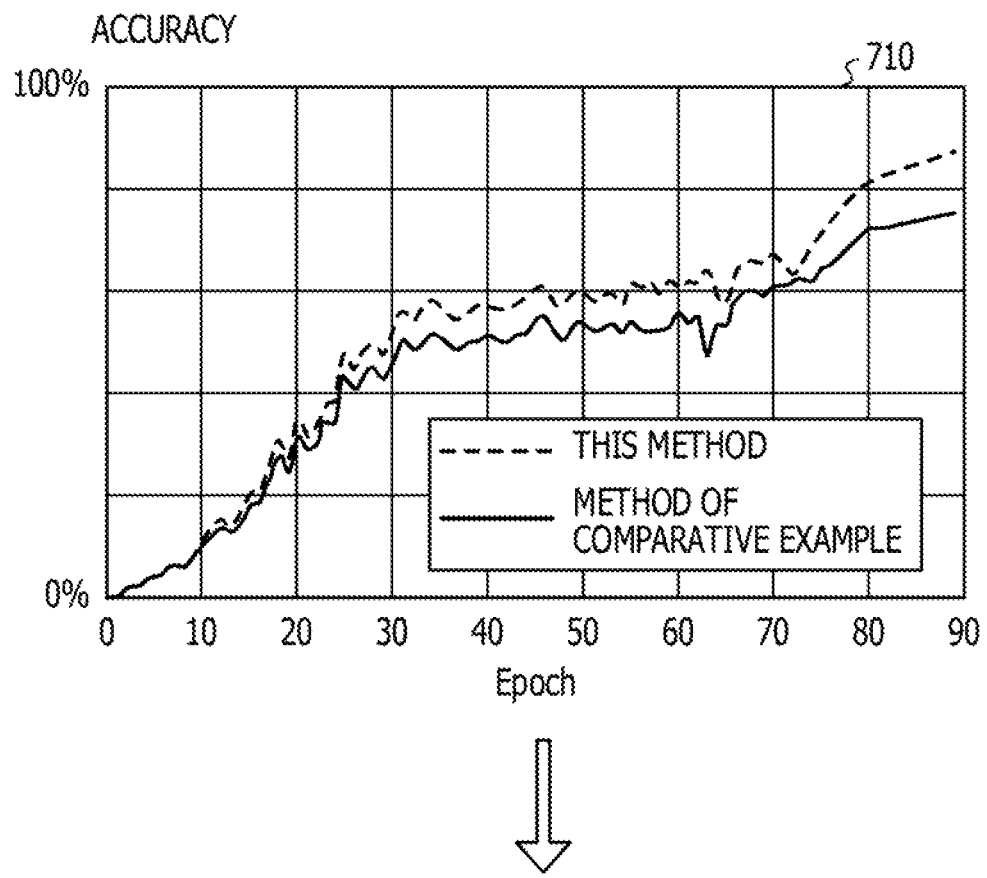
FIG. 7 illustrates an example of the accuracy of learning result.

Next, the performance of the learning result obtained by the learning unit 140 of the information processing apparatus 100 performing learning processing is described with reference to FIG. 7, being compared to learning result obtained by a learning unit of a comparative example performing learning processing. FIG. 7 illustrates performance improvement of learning result.

In graph 710 of the diagram, the horizontal axis indicates the epoch number, and the vertical axis indicates the performance of learning result (the accuracy of inference processing using the learning result). In graph 710, the dotted line indicates the performance of learning result obtained by the learning processing performed by the learning unit 140 (learning result obtained when the learning rate is changed based on a continuous curve lr calculated by the learning-rate calculation unit 120).

The solid line in graph 710 indicates the performance of learning result obtained by the learning processing performed by the learning unit of the comparative example (learning result obtained by setting a high learning rate in the early stage of the learning processing and gradually changing the learning rate to a smaller value as the learning processing advances).

As is apparent from graph 710, the learning result obtained by the learning processing performed by the learning unit 140 indicates a higher performance at any time during the learning processing.

Table 720 indicates the comparison of the final performances reached when the learning processing is ended within a finite time. As table 720 illustrates, the learning result obtained by the learning processing performed by the learning unit 140 indicates a higher performance also as a final result.

As clearly described in the above, the information processing apparatus 100 calculates the learning rate that changes in the form of a continuous curve, such that the time from when the learning rate is at the intermediate value of the maximum value to when the learning rate reaches the minimum value is shorter than the time from when the learning processing starts to when the learning rate reaches the intermediate value of the maximum value. The information processing apparatus 100 controls the amount of update at the time when the weight parameters are updated in the update processing, based on the learning rate that changes in the form of the continuous curve.

This operation makes it possible to make long the period of the state where the learning rate is high in learning processing using neural networks. Thus, the first embodiment improves the performance of learning result obtained within a finite time.

Second Embodiment

In the above first embodiment, the user is allowed to specify the time at which the learning rate starts decaying, the overall steepness of the learning-rate decay, and the steepness of the learning-rate decay after turn_epoch, to calculate a continuous curve indicating change in the learning rate.

However, the items to specify to calculate the continuous curve indicating change in the learning rate are not limited to these items. Hence, in the second embodiment, description is made of the case where the continuous curve indicating change in the learning rate is calculated by specifying items different from those in the first embodiment. The following mainly describes differences from the above first embodiment.

<Parameter Reception Unit and Learning-Rate Calculation Unit>

Figure 8:
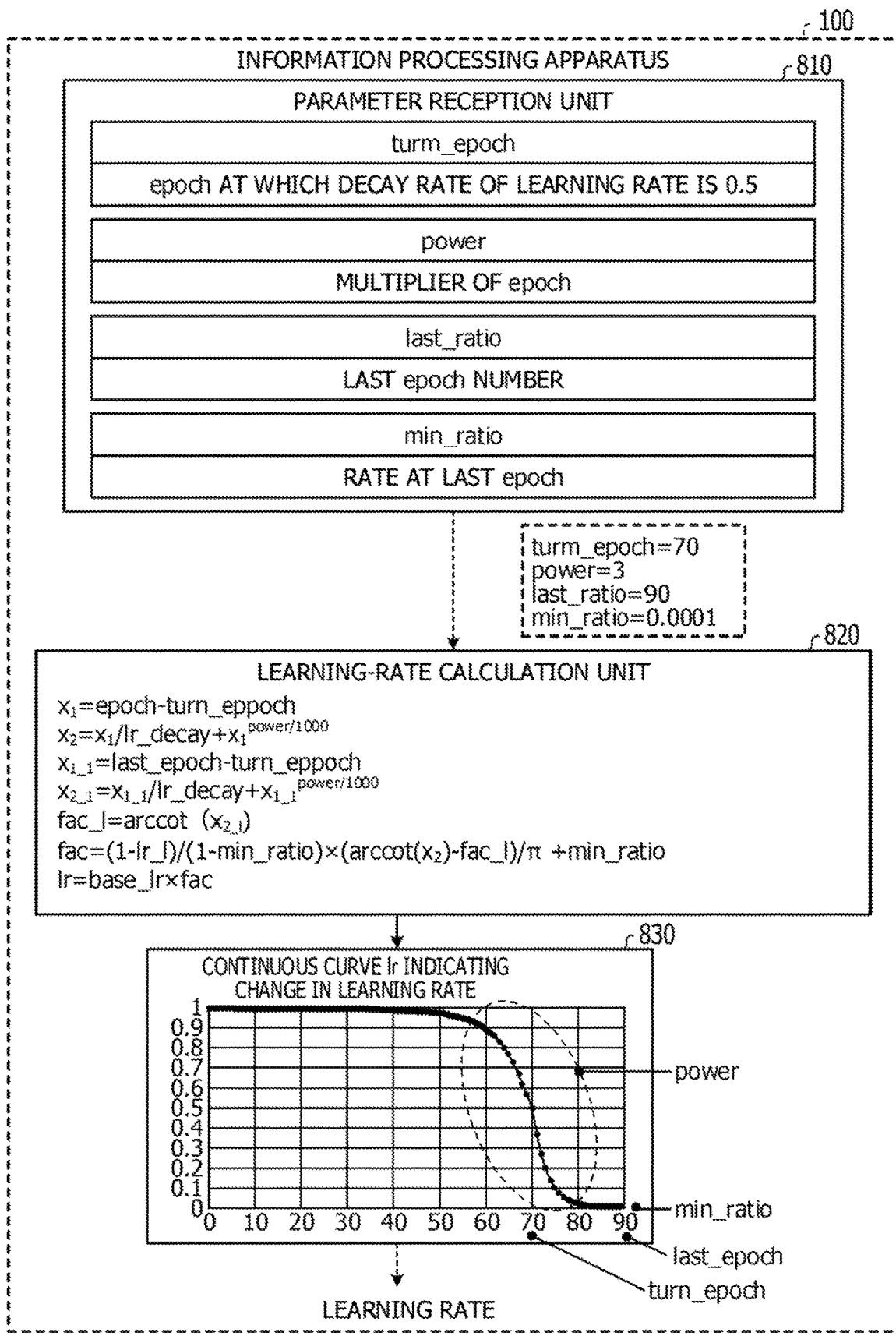
FIG. 8 is a second diagram illustrating examples of the functional configurations of a parameter reception unit and a learning-rate calculation unit of an information processing apparatus and a continuous curve indicating change in the learning rate.

FIG. 8 is a second diagram illustrating examples of the functional configurations of a parameter reception unit and a learning-rate calculation unit of an information processing apparatus and a continuous curve indicating change in the learning rate.

As illustrated in FIG. 8, a parameter reception unit 810 is an example of a reception unit and receives input of turn_epoch: the epoch at which the decay rate of the learning rate is 0.5 (the intermediate value of the maximum learning rate), power: the multiplier of the epoch, last_epoch: the last epoch number, and min_ratio: the learning rate at the last epoch (the minimum value of the learning rate). The example of FIG. 8 indicates that turn_epoch=70, power=3, last_epoch=90, and min_ratio=0.0001 are inputted.

A learning-rate calculation unit 820, which is an example of a calculation unit, uses the parameters that the parameter reception unit 810 has received as input and calculates a continuous curve lr that indicates change in the learning rate during the learning processing based on the following equations.

$$x_1 = \text{epoch} - \text{turn\_epoch}$$

$$x_2 = x_1/\text{lr\_decay} + x_1^{power/1000}$$

$$x_{1\_l} = \text{last\_epoch} - \text{turn\_epoch}$$

$$x_{2\_l} = x_{1\_l}/\text{lr\_decay} + x_{1\_l}^{power/1000}$$

$$fac\_l = \text{arccot}(x_{2\_l})$$

$$fac = (1-\text{lr\_}l)/(1-\text{min\_ratio}) \times (\text{arccot}(x_2) - fac\_l)/\pi + \text{min\_ratio}$$

$$lr = \text{base\_}lr \times fac$$

In the above equation, lr_decay represents the decay of the learning rate, lr_l represents lr at the last epoch, and base_lr represents a reference learning rate.

Graph 830 in FIG. 8 indicates an example of a continuous curve lr indicating change in the learning rate during learning processing, calculated by the learning-rate calculation unit 820. As illustrated in FIG. 8, the input of turn_epoch specifies the time at which the learning rate starts decaying. The input of power specifies the overall steepness of the learning-rate decay. The input of last_epoch specifies the last epoch. Further, the input of min_ratio specifies the end of the learning processing.

Thus, for the parameter reception unit 810 and the learning-rate calculation unit 820, the user is allowed to specify the time at which the learning rate starts decaying (turn_epoch), the overall steepness of the learning-rate decay (power), and the last epoch (last_epoch), to calculate the continuous curve lr indicating change in the learning rate.

This configuration enables the parameter reception unit 810 and the learning-rate calculation unit 820 to calculate the continuous curve lr such that the period of the state where the learning rate is high is long. Thus, the second embodiment improves the performance of the learning result as in the above first embodiment. The second embodiment enables the learning rate to transition smoothly to a specified value at the last epoch.

Other Embodiments

The above first and second embodiments have been described on the assumption that arccot is used to calculate the continuous curve indicating change in the learning rate during the learning processing. However, the function used for calculating the continuous curve indicating change in the learning rate during the learning processing is not limited to arccot, but a function other than arccot may be used.

Although the above first and second embodiments have been described on the assumption that the parameter reception unit, the learning-rate calculation unit, the learning-rate setting unit, and the learning unit are implemented in a single information processing apparatus 100, these units may be implemented in multiple information processing apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus configured to perform learning processing by using a neural network, the information processing apparatus comprising:
a memory; and
a processor coupled to the memory, the processor being configured to
execute a calculation processing that includes calculating a learning rate, the learning rate being configured to change in the form of a continuous curve such that the time from when the learning rate is at an intermediate value of a maximum value to when the learning rate reaches a minimum value is shorter than the time from when the learning processing starts to when the learning rate reaches the intermediate value of the maximum value; and
execute a control processing that includes controlling, based on the calculated learning rate, an amount of update at the time when a weight parameter is updated in an update processing.

2. The information processing apparatus according to claim 1,
wherein the processor is further configured to
a reception processing that includes receiving input of a parameter used for calculating the continuous curve,
wherein the calculation processing is configured to calculate the continuous curve based on the parameter.

3. The information processing apparatus according to claim 2, wherein
the parameter includes
an epoch at which the learning rate is at the intermediate value of the maximum value,
a multiplier of the epoch,
an acceleration rate of a decay from when the learning rate is at the intermediate value of the maximum value to when the learning rate reaches the minimum value, and
the learning rate at the last epoch.

4. The information processing apparatus according to claim 2, wherein
the parameter includes
an epoch at which the learning rate is at the intermediate value of the maximum value,
a multiplier of the epoch,
an epoch at which the learning rate is at the minimum value, and
the learning rate at the last epoch.

5. A non-transitory computer-readable storage medium for storing an information processing program which causes a computer to perform processing, the computer being configured to perform learning processing by using a neural network, the processing comprising:
executing a calculation processing that includes calculating a learning rate, the learning rate being configured to change in the form of a continuous curve such that the time from when the learning rate is at an intermediate value of a maximum value to when the learning rate reaches a minimum value is shorter than the time from when the learning processing starts to when the learning rate reaches the intermediate value of the maximum value; and
executing a control processing that includes controlling, based on the calculated learning rate, an amount of update at the time when a weight parameter is updated in an update processing.

6. A method of controlling an information processing apparatus, the information processing apparatus being configured to perform learning processing by using a neural network, the method comprising:
executing a calculation processing that includes calculating a learning rate, the learning rate being configured to change in the form of a continuous curve such that the time from when the learning rate is at an intermediate value of a maximum value to when the learning rate reaches a minimum value is shorter than the time from when the learning processing starts to when the learning rate reaches the intermediate value of the maximum value; and
executing a control processing that includes controlling, based on the calculated learning rate, an amount of update at the time when a weight parameter is updated in an update processing.

* * * * *